United States Patent
Park et al.

(10) Patent No.: US 7,830,959 B2
(45) Date of Patent: Nov. 9, 2010

(54) APPARATUS AND METHOD FOR PERFORMING INTRA PREDICTION FOR IMAGE DECODER

(75) Inventors: Seong Mo Park, Daejeon-Shi (KR); Seung Chul Kim, Daejeon-Shi (KR); Mi Young Lee, Daejeon-Shi (KR); Han Jin Cho, Daejeon-Shi (KR); Jong Dae Kim, Daejeon-Shi (KR)

(73) Assignee: Electronics and Telecommunications Research Institute, Daejon-shi (KR)

( * ) Notice: Subject to any disclaimer, the term of this patent is extended or adjusted under 35 U.S.C. 154(b) by 1584 days.

(21) Appl. No.: 10/876,739

(22) Filed: Jun. 28, 2004

(65) Prior Publication Data

US 2005/0141618 A1    Jun. 30, 2005

(30) Foreign Application Priority Data

Dec. 26, 2003   (KR)   ............... 10-2003-0097303
Mar. 12, 2004   (KR)   ............... 10-2004-0016721

(51) Int. Cl.
*H04N 7/12*   (2006.01)
*H04N 11/02*  (2006.01)
*H04N 11/04*  (2006.01)

(52) U.S. Cl. ............... 375/240.12; 375/240.24; 375/240.25

(58) Field of Classification Search ............ 375/240.12, 375/240.24, 240.25

See application file for complete search history.

(56) References Cited

U.S. PATENT DOCUMENTS

| | | | |
|---|---|---|---|
| 5,974,184 A | 10/1999 | Eifrig et al. | |
| 6,385,245 B1* | 5/2002 | De Haan et al. | 375/240.16 |
| 6,393,055 B1* | 5/2002 | Martin | 375/240 |
| 2003/0118101 A1* | 6/2003 | Dinerstein | 375/240.12 |
| 2003/0128766 A1* | 7/2003 | Tahara et al. | 375/240.26 |
| 2004/0252760 A1* | 12/2004 | Winger | 375/240.12 |
| 2004/0252768 A1* | 12/2004 | Suzuki et al. | 375/240.24 |
| 2004/0258162 A1* | 12/2004 | Gordon et al. | 375/240.25 |
| 2005/0025247 A1* | 2/2005 | Lin et al. | 375/240.24 |
| 2006/0062302 A1* | 3/2006 | Yin et al. | 375/240.16 |

OTHER PUBLICATIONS

Text of Final Committee Draft of Joint Video Specification (ITU-T Rec, G,264 | ISO/IEC 14496-10 AVC).*
Thomas Wiegand, et al.; "*Overview of the H.264/AVC Video Coding Standard*"; IEEE Transactions on Circuits and Systems for Video Technology; Jul. 2003; pp. 1-19.

* cited by examiner

*Primary Examiner*—Marsha D Banks Harold
*Assistant Examiner*—Chikaodili E Anyikire
(74) *Attorney, Agent, or Firm*—Lowe Hauptman Ham & Berner LLP

(57) ABSTRACT

Provided is an apparatus and method for performing intra prediction for an image decoder, in which by use of horizontal/vertical blocks adjacent to image data input from an external device, the intra prediction is performed in parallel with respect to 16×16 luminance component and 4×4 luminance component of the image data and then with respect to chrominance component, thereby maximizing efficiency of system to not only reduce execution time and hardware cost but also increase processing speed.

14 Claims, 5 Drawing Sheets

US 7,830,959 B2

APPARATUS AND METHOD FOR PERFORMING INTRA PREDICTION FOR IMAGE DECODER

BACKGROUND

1. Field of the Invention

The present invention relates to an apparatus and method for performing intra prediction and, more particularly, to an apparatus and method for performing intra prediction, in which by use of horizontal/vertical blocks adjacent to image data input from an external device, the intra prediction is performed in parallel with respect to 16×16 luminance component and 4×4 luminance component of the image data and then with respect to chrominance component, thereby maximizing efficiency of system to not only reduce execution time and hardware cost but also increase processing speed.

2. Discussion of Prior Art

In general, an intra prediction method according to the prior art has employed the intra prediction technique for left and up directions with respect to DC and AC values when they are selected on an intra basis with respect to 8×8 block unit. In recent years, H.264 has been decided as a standard for high image quality and the intra prediction method is adopted as a standard.

However, The intra prediction apparatus having the above-mentioned configuration for a high image quality image decoder according to the prior art employs the 8×8 block unit intra prediction technique, so that good image quality can not be obtained and the apparatus for VLSI is implemented using an additional memory, which causes a large area and high power consumption.

Furthermore, when an algorithm on the 8×8 block unit is implemented, a lot of computing time, hardware cost, and enormous operations are taken and required, so that it is not suitable for a moving picture coder to be implemented in real-time. In addition, an amount of unnecessary operations is require because a fixed algorithm is used according to image type and application field, therefore a proper intra prediction algorithm can not be used in response to the image type.

SUMMARY OF THE INVENTION

The present invention is directed to an apparatus for performing intra prediction for an image decoder. According to a preferred embodiment of the present invention, a parallel structure and a memory structure capable of performing real-time application are provided, so that information of adjacent image data having a high correlation between adjacent pictures of the image data input from an external device is intra predicted to compress and recover current image data to nearly original image data, which leads to maximize system efficiency and reduce executing time while reduce hardware cost at the same.

The present invention is also directed to an apparatus for performing intra prediction for an image decoder. According to a preferred embodiment of the present invention, intra prediction is performed for each of 16×16 luminance component, 4×4 luminance component, and chrominance component of image data input from an external device, wherein only one memory is shared to effectively reduce memory cost.

The present invention is directed to a method for performing intra prediction for an image decoder. According to a preferred embodiment of the present invention, intra prediction is parallel processed with respect to the 16×16 luminance component and 4×4 luminance component using horizontal/vertical blocks adjacent to image data input from an external device and the intra prediction is then performed with respect to chrominance component, which leads to increase processing speed.

One aspect of the present invention is to provide an apparatus for performing intra prediction for an image decoder, which comprises a memory for storing image data; a prediction apparatus for parallel processing intra prediction with respect to 16×16 luminance component and 4×4 luminance component and then performing intra prediction for chrominance component by means of horizontal/vertical blocks adjacent to image data supplied from the memory; a multiplexer for selecting a result operated from the prediction apparatus; and a first control unit for controlling the memory, the prediction apparatus and the multiplexer.

Another aspect of the present invention is to provide a method for performing intra prediction for an image decoder, which comprises the steps of (a) storing image data; (b) parallel processing intra prediction with respect to 16×16 luminance component and 4×4 luminance component by means of horizontal/vertical blocks adjacent to the stored image data; and (c) performing intra prediction for chrominance component by means of the horizontal/vertical blocks adjacent to the stored image data.

DETAILED DESCRIPTION OF PREFERRED EMBODIMENTS

Hereinafter, preferred embodiments of the present invention will be described in detail with reference to accompanying drawings. The present embodiment is not intended to limit the scope of the present invention, but is described as an example.

Figure 1:
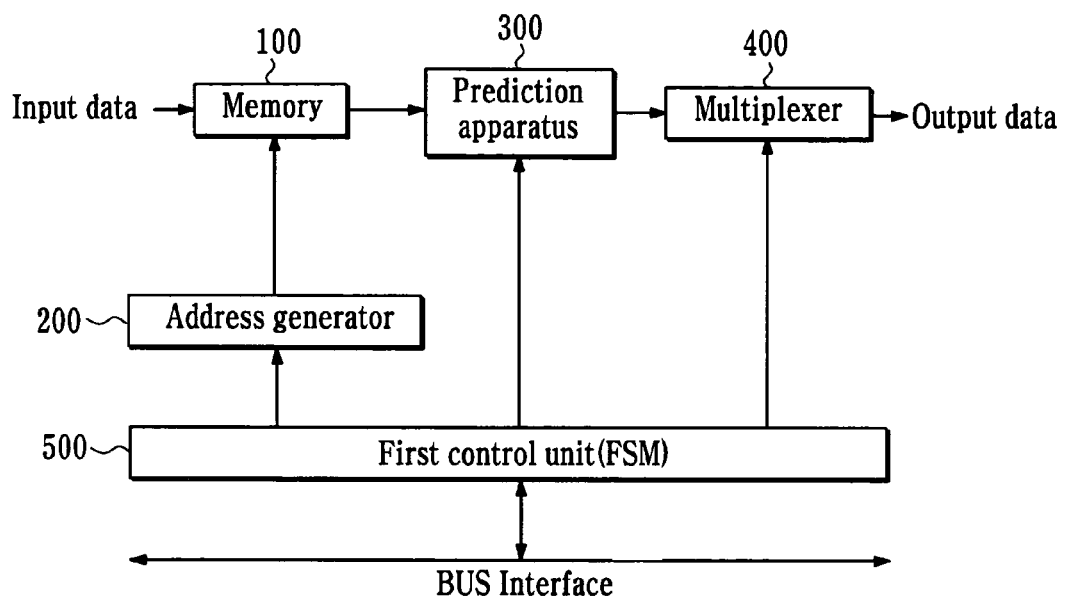
FIG. 1 shows a block configuration of an intra prediction apparatus for an image decoder in accordance with one embodiment of the present invention.
Figure 2:
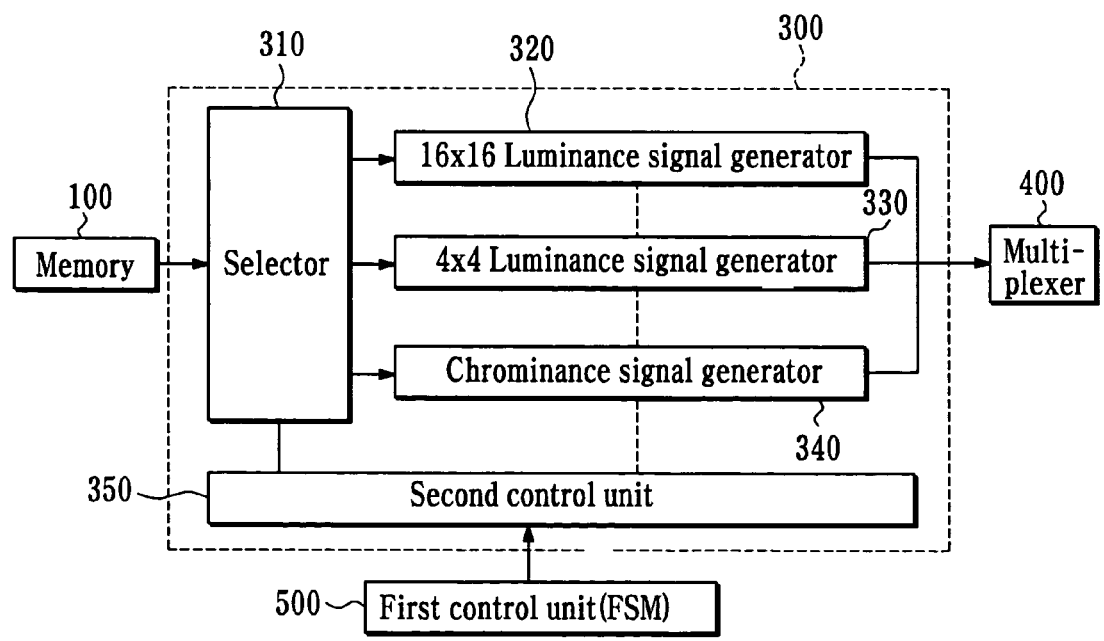
FIG. 2 shows a detailed block configuration of the intra prediction apparatus of FIG. 1.

FIG. 1 shows a block configuration of an intra prediction apparatus for an image decoder in accordance with one embodiment of the present invention, FIG. 2 shows a detailed block configuration of the intra prediction apparatus of FIG.

Figure 3:
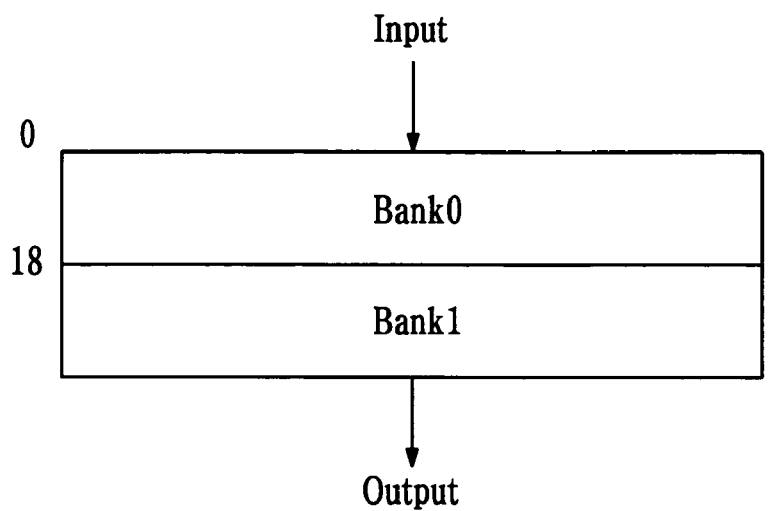
FIG. 3 shows a local memory structure for intra prediction of the memory of FIG. 1.

1, and FIG. 3 shows a local memory structure for intra prediction of the memory of FIG. 1.

Referring to FIG. 1, the intra prediction apparatus for the image decoder comprises a memory 100, an address generator 200, a prediction apparatus 300, a multiplexer 400 (Mux), and a first control unit 500 (FSM).

In the above-mentioned configuration, the memory 100 acts to store image data input from an external device, and referring to FIG. 3, each of luminance component and chrominance component does not have a separate memory but shares one memory to reduce memory cost, and at the same 1×17 memory is separated into two of Bank0 and Bank1 so as to separately store horizontal/vertical components of each of the luminance component and chrominance component.

In addition, the image data stored in the memory 100 is processed in 4×4 block unit, so that the memory size becomes one sixteenth of the 16×16 block to reduce memory capacity and parallel process the intra prediction with respect to 16×16 luminance component and 4×4 chrominance component, and the intra prediction for chrominance component is processed after the luminance component is processed to minimize the memory cost.

The address generator 200 acts to generate a corresponding address to allow the image data stored in the memory 100 to be read/written.

The prediction apparatus 300 is supplied with the image data stored in the memory 100 and parallel processes the intra prediction with respect to 16×16 luminance component and 4×4 luminance component and then processes the intra prediction for chrominance component using horizontal/vertical blocks adjacent to the image data.

Referring to FIG. 2, the prediction apparatus 300 includes a selector 310, a 16×16 luminance signal generator 320, a 4×4 luminance signal generator 330, a chrominance signal generator 340, and a second control unit 350.

In this case, the selector 310 acts to selectively output the 16×16 luminance component, 4×4 luminance component, and chrominance component of the image data stored in the memory 100.

The 16×16 luminance signal generator 320 operates to perform intra prediction by selecting any one prediction mode among various predetermined prediction modes with respect to the 16×16 luminance component output from the selector 310. (see FIG. 7).

The 4×4 luminance signal generator 330 operates to perform intra prediction by selecting any one prediction mode among various predetermined prediction modes with respect to the 4×4 luminance component output from the selector 310. (see FIG. 8).

The chrominance signal generator 340 operates to perform intra prediction by selecting any one prediction mode among various predetermined prediction modes with respect to the chrominance component output from the selector 310.

The second control unit 350 controls the image data input to the selector 310 to output the 16×16 luminance signal generator 320, the 4×4 luminance signal generator 330, and the chrominance signal generator 340, respectively based on respective luminance and chrominance components, and to parallel process the intra prediction for the 16×16 luminance component and the 4×4 luminance component and then process the intra prediction for the chrominance component by using horizontal/vertical blocks adjacent to the input image data.

The multiplexer 400 (Mux) selects the result operated from the prediction apparatus 300, and the first control unit 500 (FSM) is responsible for total control of the intra prediction apparatus.

Figure 4:
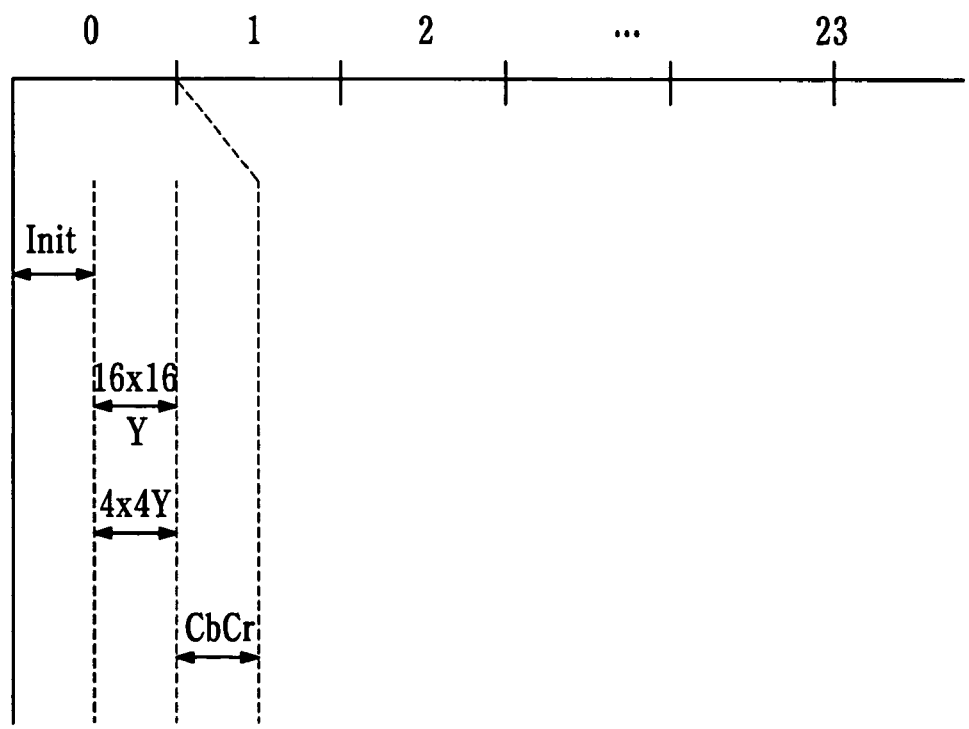
FIG. 4 shows a concept view for explaining data flow of a prediction algorithm applied in an intra prediction apparatus for an image decoder in accordance with one embodiment of the present invention.

FIG. 4 shows a concept view for explaining data flow of a prediction algorithm applied in an intra prediction apparatus for an image decoder in accordance with one embodiment of the present invention, wherein the image data stored in the memory 100 (see FIG. 1) parallel processes the intra prediction for the 16×16 luminance component 16×16Y and 4×4 luminance component 4×4Y, and then processes the intra prediction for the chrominance component CbCr.

Figure 5:
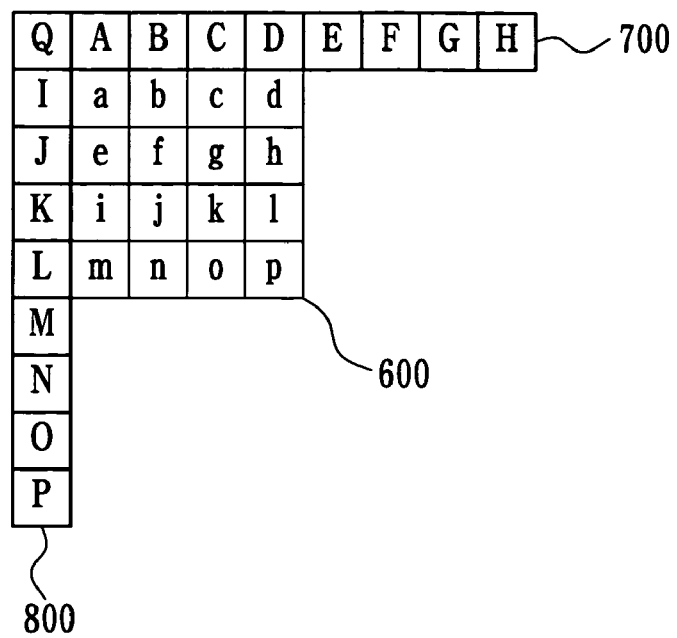
FIG. 5 shows a view for explaining intra spatial prediction applied in an intra prediction apparatus for an image decoder in accordance with one embodiment of the present invention.

FIG. 5 shows a view for explaining intra spatial prediction applied in an intra prediction apparatus for an image decoder in accordance with one embodiment of the present invention, wherein a-p indicates pixels included in the 4×4 block 600 of current image data input from an external device, A-H indicates pixels within the horizontal block 700 adjacent to the 4×4 block 600, and I-Q indicates pixels within the vertical block 800 adjacent to the 4×4 block 600.

Figure 6:
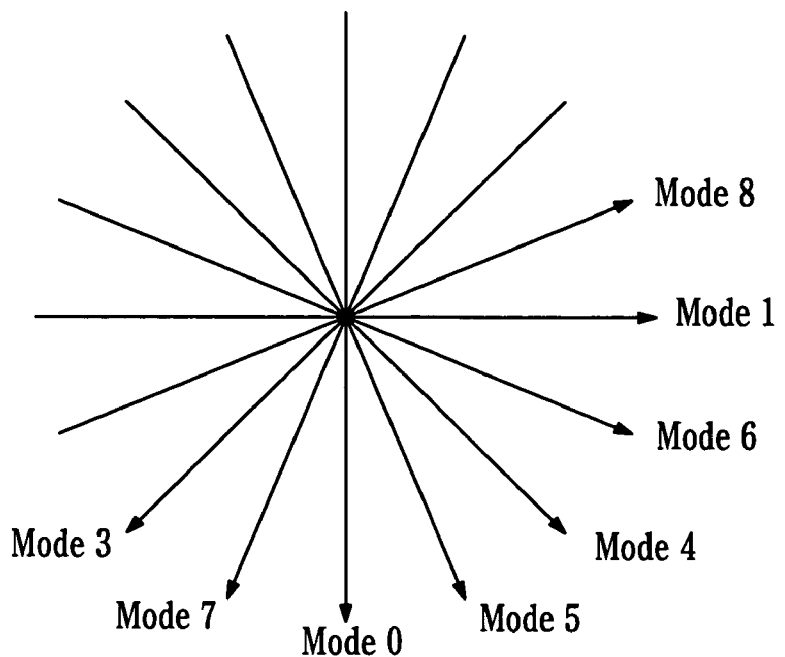
FIG. 6 shows a view for explaining prediction directions of 4×4 luminance component prediction modes applied in an intra prediction apparatus for an image decoder in accordance with one embodiment of the present invention.

FIG. 6 shows a view for explaining prediction directions of 4×4 luminance component prediction modes applied in the intra prediction apparatus for an image decoder in accordance with one embodiment of the present invention, wherein the direction includes a second vertical prediction mode MODE 0, a second horizontal prediction mode MODE 1, a second DC prediction mode MODE 2, a diagonal down/left prediction mode MODE 3, a diagonal down/right prediction mode MODE 4, a horizontal-left prediction mode MODE 5, a horizontal-down prediction mode MODE 6, a vertical-right prediction mode MODE 7, and a horizontal-up prediction mode MODE 8.

Figure 7:
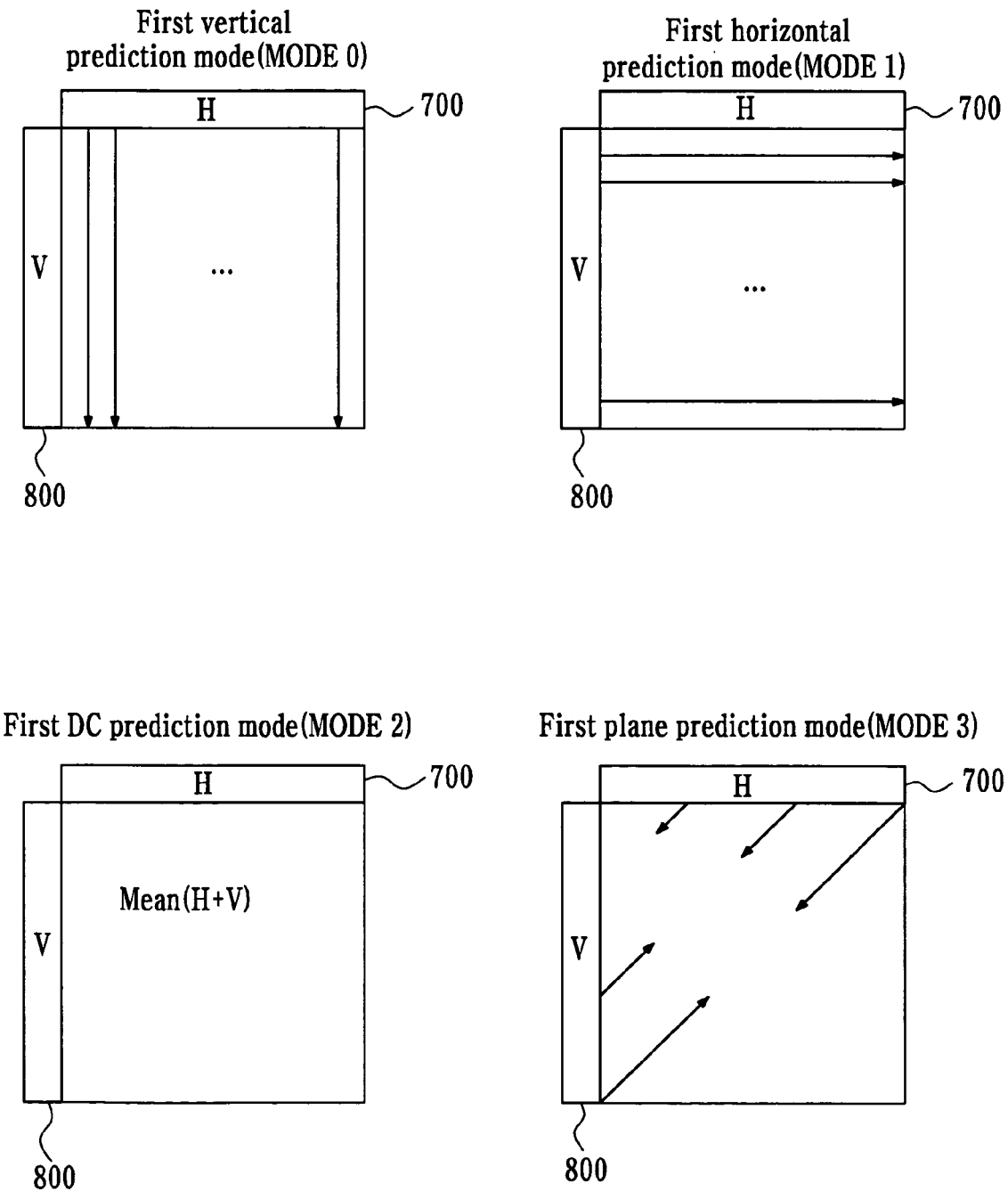
FIG. 7 shows a view for explaining four prediction modes of 16×16 luminance component applied in an intra prediction apparatus for an image decoder in accordance with one embodiment of the present invention.

FIG. 7 shows a view for explaining four prediction modes of 16×16 luminance component applied in an intra prediction apparatus for an image decoder in accordance with one embodiment of the present invention.

Referring to FIG. 7, the 16×16 luminance signal generator 320 (see FIG. 2) according to the present invention selectively performs the following four prediction modes for the 16×16 luminance component.

Four prediction modes for the 16×16 luminance component consist of a first vertical prediction mode MODE 0, a first horizontal prediction mode MODE1, a first DC prediction mode MODE 2, and a first plane prediction mode MODE 3, and prediction mode is performed for pixels used for the 16×16 luminance component by means of horizontal values of 0 to 15 and vertical values of 0 to 15.

x and y of P(x,y) represents 0, 1, . . . 15 in the horizontal direction and 0, 1, . . . 15 in the vertical direction, respectively. P(x,−1), x=0, 1, . . . 15 indicates an upper block adjacent to block, namely, a horizontal block H (700), and P(−1,y), y=0, 1, . . . 15 indicates an left block adjacent to block, namely, a vertical block V (800). In the meantime, the block P(x,−1) or block P(−1,y) is not considered in the following cases.

① when the block is present outside the picture or is not the current slice

② when the block is a non intra macro block, and the value of contrained_intra_pred is 1

MODE 0: First Vertical Prediction Mode

When all horizontal blocks (P(x,−1))(H) adjacent to the current input 16×16 luminance component block are effective, an intra prediction value Pred(x, y) is obtained by the following equation 1.

$$Pred(x,y)=P(x,-1), x,y=0, 1, \ldots , 15 \quad [\text{equation 1}]$$

Wherein x indicates the horizontal component with respect to pixels within the 16×16 luminance component block, and y indicates the vertical component with respect to pixels within the 16×16 luminance component.

MODE 1: First Horizontal Prediction Mode

When all vertical blocks (P(−1,y))(V) adjacent to the current input 16×16 luminance component block are effective, an intra prediction value Pred(x, y) is obtained by the following equation 2.

$$Pred(x,y)=P(-1,y), x,y=0, 1, \ldots 15 \quad \text{[equation 2]}$$

Wherein x indicates the horizontal component with respect to pixels within the 16×16 luminance component block, and y indicates the vertical component with respect to pixels within the 16×16 luminance component.

MODE 2: First DC Prediction Mode

When all horizontal/vertical blocks (P(x,−1)/P(−1,y))(H)(V) adjacent to the current input 16×16 luminance component block are effective, an intra prediction value Pred(x, y) with respect to all pixels within the 16×16 luminance component block is obtained by the following equation 3.

$$Pred(x, y) = \left[\sum_{x'=0}^{15} P(x', -1) + \sum_{y'=0}^{15} P(-1, y') + 16\right]/32, \quad \text{[equation 3]}$$
$$x, y = 0, 1, \ldots, 15$$

When all horizontal blocks (P(x,−1))(H) adjacent to the current input 16×16 luminance component block are not effective and all vertical blocks (P(−1,y))(V) adjacent to the current input 16×16 luminance component block are effective, an intra prediction value Pred(x, y) with respect to all pixels within the 16×16 luminance component block is obtained by the following equation 4.

$$Pred(x, y) = \left[\sum_{y'=0}^{15} P(-1, y') + 8\right]/16, \quad \text{[equation 4]}$$
$$x, y = 0, 1, \ldots, 15$$

When all vertical blocks (P(−1,y))(V) adjacent to the current input 16×16 luminance component block are not effective and all horizontal blocks (P(x,−1))(H) adjacent to the current input 16×16 luminance component block are effective, an intra prediction value Pred(x, y) with respect to all pixels within the 16×16 luminance component block is obtained by the following equation 5.

$$Pred(x, y) = \left[\sum_{x'=0}^{15} P(x', -1) + 8\right]/16, \quad \text{[equation 5]}$$
$$x, y = 0, 1, \ldots, 15$$

When all horizontal/vertical blocks (P(x,−1)/P(−1,y))(H)(V) adjacent to the current input 16×16 luminance component block are not effective, an intra prediction value Pred(x, y) with respect to all pixels within the 16×16 luminance component block is obtained to be 128.

MODE 3: First Plane Prediction Mode

When all horizontal/vertical blocks (P(x,−1)/P(−1,y))(H)(V) adjacent to the current input 16×16 luminance component block are effective, an intra prediction value Pred(x, y) with respect to all pixels within the 16×16 luminance component block is obtained by the following equation 6.

$$Pred(x,y)=Clip1\{(a+b\cdot(x-7)+c\cdot(y-7)+16\}/32] \quad \text{[equation 6]}$$

Wherein a=16·{P(−1,15)+P(15,−1)}, b=(5*H+32)/64, c=(5*V+32)/64, and $$H = \sum_{x=1}^{8} x \cdot (P(7+x, -1) - P(7-x, -1))$$

$$V = \sum_{y=1}^{8} y \cdot (P(-1, 7+y) - P(-1, 7-y))$$

Figure 8:
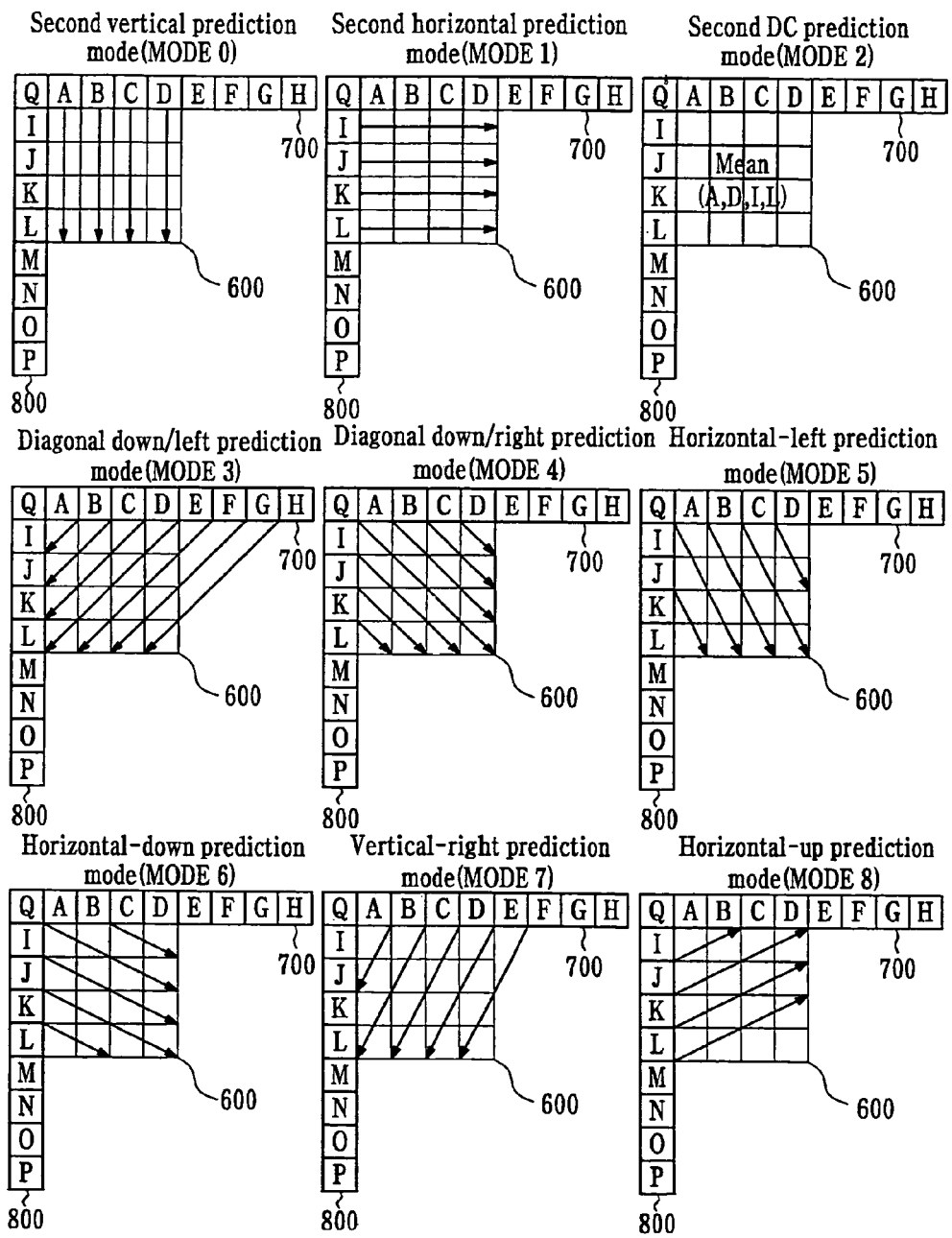
FIG. 8 shows a view for explaining nine prediction modes of 4×4 luminance component applied in an intra prediction apparatus for an image decoder in accordance with one embodiment of the present invention.

FIG. 8 shows a view for explaining nine prediction modes of 4×4 luminance component applied in an intra prediction apparatus for an image decoder in accordance with one embodiment of the present invention.

Referring to FIG. 8, the 4×4 luminance signal generator 330 (see FIG. 2) according to the present invention selectively performs nine prediction modes for the 4×4 luminance component. Nine prediction modes for the 4×4 luminance component consist of a second vertical prediction mode MODE 0, a second horizontal prediction mode MODE 1, a second DC prediction mode MODE 2, a diagonal down/left prediction mode MODE 3, a diagonal down/right prediction mode MODE 4, a horizontal-left prediction mode MODE 5, a horizontal-down prediction mode MODE 6, a vertical-right prediction mode MODE 7, and a horizontal-up prediction mode MODE 8, wherein a to p indicates pixels included in the 4×4 block 600, A to H indicates pixels within the horizontal block 700 adjacent to the 4×4 block 600, and I to Q indicates pixels within the vertical block 800 adjacent to the 4×4 block 600 (see FIG. 5).

In addition, the pixels A to Q within the adjacent vertical/horizontal blocks 700 and 800 must be predecoded for prediction. The pixels a to p within the 4×4 block 600 do not take into account the A to Q when the following conditions are met.

In other words, intra prediction is not performed when the pixels are outside the picture or outside the current slice, when one macro block is continuously included in a current macro block in a raster scan order, when pixels are sent to be correlated to the current 4×4 block 600 in an order of motion compensation blocks (from 16×16 blocks to 4×4 blocks), when they are not intra macro blocks, or when the value of constrained_intra_pred is 1.

In the meantime, when the image data E to H are not useful, pixel value of D is replaced with that of E, and pixel value of H is replaced with that of D. In addition, when the image data M to P are not useful, pixel value of L is replaced with that of L.

MODE 0: Second Vertical Prediction Mode

When pixels A, B, C, and D within the horizontal block 700 adjacent to the current input 4×4 luminance component block 600 are effective, values of intra prediction with respect to all pixels a to p within the 4×4 luminance component block 600 are obtained by the following equation 7.

$$a,e,i,m \rightarrow A, \; b,f,j,n \rightarrow B$$

$$c,g,k,o \rightarrow C, \; d,h,l,p \rightarrow D \quad \text{[equation 7]}$$

MODE 1: Second Horizontal Prediction Mode

When pixels I, J, K, and L within the vertical block 800 adjacent to the current input 4×4 luminance component block 600 are effective, values of intra prediction with respect to all pixels a to p within the 4×4 luminance component block 600 are obtained by the following equation 8.

$$a,b,c,d \rightarrow I \quad e,f,g,h \rightarrow J$$

$$i,j,k,l \rightarrow K \quad m,n,o,p \rightarrow L \qquad \text{[equation 8]}$$

MODE 2: Second DC Prediction Mode

When pixels A to D and I to L within the horizontal/vertical blocks 700 and 800 adjacent to the current input 4×4 luminance component block 600 are effective, values of intra prediction (P(a~p)) with respect to all pixels a to p within the 4×4 luminance component block 600 are obtained by the following equation 9.

$$P(a\sim p)=(A+B+C+D+I+J+K+L+4)/8 \qquad \text{[equation 8]}$$

When pixels A, B, C and D within the horizontal block 700 and adjacent to the current input 4×4 luminance component block 600 are not effective and pixels I, J, K, and L within the vertical block 800 are effective, values of intra prediction (P(a~p)) with respect to all pixels a to p within the 4×4 luminance component block 600 are obtained by the following equation 10.

$$P(a\sim p)=(I+J+K+L+2)/4 \qquad \text{[equation 10]}$$

When pixels I, J, K and L within the vertical block 800 adjacent to the current input 4×4 luminance component block 600 are not effective and pixels A, B, C, and D within the horizontal block 700 are effective, values of intra prediction (P(a~p)) with respect to all pixels a to p within the 4×4 luminance component block 600 are obtained by the following equation 11.

$$P(a\sim p)=(A+B+C+D+2)/4 \qquad \text{[equation 11]}$$

When pixels A to D and I to L within the horizontal/vertical blocks 700 and 800 adjacent to the current input 4×4 luminance component block 600 are not effective, values of intra prediction with respect to all pixels a to p within the 4×4 luminance component block 600 are obtained to be 128.

MODE 3: Diagonal Down/Left Prediction Mode

When pixels A to D, I to L, and Q among all pixels A to Q within the horizontal/vertical blocks 700 and 800 adjacent to the current input 4×4 luminance component block 600 are effective, values of intra prediction (P(a~p)) with respect to all pixels a to p within the 4×4 luminance component block 600 are obtained by the following equation 12.

$$P(a)=(A+2B+C+I+2J+K+4)/8$$

$$P(b,e)=(B+2C+D+J+2K+L+4)/8$$

$$P(c,f,i)=(C+2D+E+K+2L+M+4)/8,$$

$$P(d,g,j,m)=(D+2E+F+L+2M+N+4)/8,$$

$$P(h,k,n)=(E+2F+G+M+2N+O+4)/8,$$

$$P(l,o)=(F+2G+H+N+2O+P+4)/8,$$

$$P(p)=(G+H+O+P+2)/4 \qquad \text{[equation 12]}$$

MODE 4: Diagonal Down/Right Prediction Mode

When pixels A to D, I to L, and Q among all pixels A to Q within the horizontal/vertical blocks 700 and 800 adjacent to the current input 4×4 luminance component block 600 are effective, values of intra prediction (P(a~p)) with respect to all pixels a to p within the 4×4 luminance component block 600 are obtained by the following equation 13.

$$P(m)=(J+2K+L+2)/4,$$

$$P(i,n)=(I+2J+K+2)/4,$$

$$P(e,j,o)=(Q+2I+J+2)/4,$$

$$P(a,f,k,p)=(A+2Q+I+2)/4,$$

$$P(b,g,l)=(Q+2A+B+2)/4,$$

$$P(c,h)=(A+2B+C+2)/4,$$

$$P(d)=(B+2C+D+2)/4 \qquad \text{[equation 13]}$$

MODE 5: Horizontal/Left Prediction Mode

When pixels A to D, I to L, and Q among all pixels A to Q within the horizontal/vertical blocks 700 and 800 adjacent to the current input 4×4 luminance component block 600 are effective, values of intra prediction (P(a~p)) with respect to all pixels a to p within the 4×4 luminance component block 600 are obtained by the following equation 14.

$$P(a,j)=(Q+A+1)/2,$$

$$P(b,k)=(A+B+1)/2,$$

$$P(c,l)=(B+C+1)/2,$$

$$P(d)=(C+D+1)/2,$$

$$P(e,n)=(I+2Q+A+2)/4,$$

$$P(f,o)=(Q+2A+B+2)/4,$$

$$P(g,p)=(A+2B+C+2)/4,$$

$$P(h)=(B+2C+D+2)/4,$$

$$P(i)=(Q+2I+J+2)/4,$$

$$P(m)=(I+2J+K+2)/4 \qquad \text{[equation 14]}$$

MODE 6: Horizontal/down Prediction Mode

When pixels A to D, I to L, and Q among all pixels A to Q within the horizontal/vertical blocks 700 and 800 adjacent to the current input 4×4 luminance component block 600 are effective, values of intra prediction (P(a~p)) with respect to all pixels a to p within the 4×4 luminance component block 600 are obtained by the following equation 15.

$$P(a,g)=(Q+I+1)/2,$$

$$P(b,h)=(I+2Q+A+2)/4,$$

$$P(c)=(Q+2A+B+2)/4,$$

$$P(d)=(A+2B+C+2)/4,$$

$$P(e,k)=(I+J+1)/2,$$

$$P(f,l)=(Q+2I+J+2)/4,$$

$$P(i,o)=(J+K+1)/2,$$

$$P(j,p)=(I+2J+K+2)/4,$$

$$P(m)=(K+L+1)/2,$$

$$P(n)=(J+2K+L+2)/4 \qquad \text{[equation 15]}$$

MODE 7: Vertical/Right Prediction Mode

When pixels A to D, I to L, and Q among all pixels A to Q within the horizontal/vertical blocks 700 and 800 adjacent to the current input 4×4 luminance component block 600 are effective, values of intra prediction (P(a~p)) with respect to all pixels a to p within the 4×4 luminance component block 600 are obtained by the following equation 16.

$$P(a)=(2A+2B+J+2K+L+4)/8,$$

$$P(b,i)=(B+C+1)/2,$$

$$P(c,j)=(C+D+1)/2,$$

$$P(d,k)=(D+E+1)/2,$$

$$P(l)=(E+F+1)/2,$$

$$P(e)=(A+2B+C+K+2L+M+4)/8,$$

$$P(f,m)=(B+2C+D+2)/4,$$

$$P(g,n)=(C+2D+E+2)/4,$$

$$P(h,o)=(D+2E+F+2)/4$$

$$P(p)=(E+2F+G+2)/4 \qquad \text{[equation 16]}$$

MODE 8: Horizontal/Up Prediction Mode

When pixels A to D, I to L, and Q among all pixels A to Q within the horizontal/vertical blocks 700 and 800 adjacent to the current input 4×4 luminance component block 600 are effective, values of intra prediction (P(a~p)) with respect to all pixels a to p within the 4×4 luminance component block 600 are obtained by the following equation 17.

$$P(a)=(B+2C+D+2I+2J+4)/8,$$

$$P(b)=(C+2D+E+I+2J+K+4)/8,$$

$$P(c,e)=(J+K+1)/2,$$

$$P(d,f)=(J+2K+L+2)/4,$$

$$P(g,i)=(K+L+1)/2,$$

$$P(h,j)=(K+2L+M+2)/4,$$

$$P(l,n)=(L+2M+N+2)/4,$$

$$P(k,m)=(L+M+1)/2,$$

$$P(o)=(M+N+1)/2$$

$$P(p))=(M+2N+O+2)/4 \qquad \text{[equation 17]}$$

Intra prediction in the chrominance signal generator 340 (see FIG. 2) is performed by a third vertical prediction mode MODE 0, a third DC prediction mode MODE1, and a third plane prediction mode MODE 2, and the chrominance with respect to intra macro blocks is processed by a method similar to that for the intra prediction with respect to the luminance component of intra 16×16 macro block using four prediction modes. Such prediction mode is applied to two chrominance blocks. However, this is applied independent from the case when it is applied to the luminance. Block used for 8×8 luminance is allowed to use 0 to 7 in a horizontal direction and 0 to 7 in a vertical direction so that the prediction mode is performed.

x and y of P(x, y) represents 0, 1, . . . 7 in the horizontal direction and 0, 1, . . . 7 in the vertical direction, respectively. P(x,−1), x=0, 1, . . . 7 indicates an upper block adjacent to the horizontal block 700, and P(−1,y), y=0, 1, . . . 7 indicates an left block adjacent to the left vertical block 800. In the meantime, block P(x,−1) or block P(−1,y) is not considered in the following cases.

①when the block is present outside the picture or is not the current slice

②when the block is a non intra macro block, and the value of contrained_intra_pred is 1

The value of the p(x,y) is set to be 128 when it is not effective.

MODE 0: Third Vertical Prediction Mode

When all horizontal blocks (P(x,−1))(H) adjacent to the current input chrominance component block are effective, values of intra prediction (Pred(x,y)) are obtained by the following equation 18.

$$\text{Pred}(x,y)=F(x,-1), x,y=0, 1, \ldots, 7 \qquad \text{[equation 18]}$$

Wherein, F(0,−1)={P(0,−1)+P(1,−1)+1}/2, F(x,−1)={P(x−1,−1)+2×P(x,−1)+P(x+1,−1)+2}/4, x=1, 2, . . . , 6, F(7,−1)={P(6,−1)+P(7,−1)+1}/2, x=a horizontal component with respect to pixels within the chrominance component block, and y=a vertical component with respect to pixels within the chrominance component.

MODE 1: Third Horizontal Prediction Mode

When all vertical blocks (P(−1,y))(V) adjacent to the current input chrominance component block are effective, values of intra prediction (Pred(x,y)) are obtained by the following equation 19.

$$\text{Pred}(x,y)=F(-1,y), x,y=0, 1, \ldots, 7 \qquad \text{[equation 19]}$$

Wherein, F(−1,0)={P(−1,0)+P(−1,1)+1}/2, F(−1,y)={P(−1,y−1)+2×P(−1,y)+P(−1,y+1)+2}/4, y=1, 2, . . . , 6, F(−1,7)={P(−1,6)+P(−1,7)+1}/2, x=a horizontal component with respect to pixels within the chrominance component block, and y=a vertical component with respect to pixels within the chrominance component.

MODE 2: Third DC Prediction Mode

When all horizontal/vertical blocks (P(x,−1)/P(−1,y))(H)(V) adjacent to the current input chrominance component block are effective, values of intra prediction (Pred(x,y)) are obtained by the following equation 20.

$$\text{Pred}(x, y) = \left[\left\{\sum_{n=0}^{7} (P(-1, n) + P(n, -1))\right\} + 8\right]/16, \qquad \text{[equation 20]}$$

$$x, y = 0, 1, \ldots, 7$$

When all horizontal blocks (P(x,−1))(H) adjacent to the current input chrominance component block are not effective and all vertical blocks (P(−1,y))(V) adjacent to the current input chrominance component block are effective, values of intra prediction (Pred(x,y)) are obtained by the following equation 21.

$$\text{Pred}(x, y) = \left[\left\{\sum_{n=0}^{7} P(-1, n) + 4\right\}\right]/8, \qquad \text{[equation 21]}$$

$$x, y = 0, 1, \ldots, 7$$

When all vertical blocks (P(−1,y))(V) adjacent to the current input chrominance component block are not effective and all horizontal blocks (P(x,−1))(H) adjacent to the current input chrominance component block are effective, values of intra prediction (Pred(x,y)) are obtained by the following equation 22.

$$Pred(x, y) = \left[\left\{\left(\sum_{n=0}^{7} P(n, -1)\right) + 4\right\}\right]/8,$$

$$x, y = 0, 1, \ldots, 7$$

[equation 22]

When all horizontal/vertical blocks (P(x,−1)/P(−1,y))(H)(V) adjacent to the current input chrominance component block are not effective, values of intra prediction (Pred(x,y)) are obtained to be 128.

MODE 3: Third Plane Prediction Mode

When all horizontal/vertical blocks (P(x,−1)/P(−1,y))(H)(V) adjacent to the current input chrominance component block are effective, values of intra prediction (Pred(x,y)) are obtained by the following equation 23.

Pred(x,y)=Clip1{{a+b·(x−3)+c·(y−3)+16}/32}, x,y=0, 1, ..., 7         [equation 23]

Wherein, a=16·{P(−1,7)+P(7,−1)}, b=(17*H+16)/32, c=(17*V+16)/32, and $$H = \sum_{x=1}^{4} x \cdot (P(3+x, -1) - P(3-x, -1))$$

$$V = \sum_{y=1}^{4} y \cdot (P(-1, 3+y) - P(-1, 3-y))$$

As mentioned above, in accordance with the intra prediction apparatus for the image decoder and method for the same, system efficiency may be maximized to reduce executing time as well as hardware cost by means of a parallel structure and a memory structure capable of performing real-time application.

In addition, intra prediction is performed for each of 16×16 luminance component, 4×4 luminance component, and chrominance component of image data input from an external device, wherein only one memory is shared to effectively reduce memory cost.

Furthermore, in accordance with the present invention, intra prediction with respect to 16×16 luminance component and 4×4 luminance component is parallel processed and the intra prediction with respect to the chrominance component is then processed, which allows to increase processing speed.

While the present invention has been described with reference to embodiments of the intra prediction apparatus for an image decoder and method for the same, it is understood that the disclosure has been made for purpose of illustrating the invention by way of examples and is not limited to limit the scope of the invention. And one skilled in the art can make amend and change the present invention without departing from the scope and spirit of the invention.

What is claimed is:

1. An apparatus for performing intra prediction for an image decoder, said apparatus comprising:
   a memory for storing image data;
   a prediction apparatus for parallel processing intra prediction with respect to 16×16 luminance component and 4×4 luminance component and then performing intra prediction for chrominance component by means of horizontal/vertical blocks adjacent to the image data supplied from the memory;
   a multiplexer for selecting a result operated from the prediction apparatus; and
   a first control unit for controlling the memory, the prediction apparatus and the multiplexer;
   wherein the prediction apparatus includes:
   a selector for selecting and outputting the 16×16 luminance component, 4×4 luminance component, and chrominance component of the image data stored in the memory;
   a 16×16 luminance signal generator for performing intra prediction by selecting any one among various predetermined prediction modes with respect to the 16×16 luminance component output from the selector;
   a 4×4 luminance signal generator for performing intra prediction by selecting any one among various predetermined prediction modes with respect to the 4×4 luminance component output from the selector;
   a chrominance signal generator for performing intra prediction by selecting any one among various predetermined prediction modes with respect to the chrominance component output from the selector; and
   a second control unit for controlling the image data input to the selector to be output to the 16×16 luminance signal generator, 4×4 luminance signal generator, and chrominance signal generator, respectively, based on each luminance component and chrominance component, and for allowing the intra prediction with respect to the 16×16 luminance component and 4×4 luminance component to be parallel processed, and then the intra prediction with respect to the chrominance component to be processed.

2. The apparatus as claimed in claim 1, wherein the memory is shared to store one of the luminance component and chrominance component of the image data at a time, and is divided into two of 1×17 memory banks so as to separately store horizontal and vertical components, respectively, of said luminance or chrominance component.

3. The apparatus as claimed in claim 1, wherein the various predetermined prediction modes in the 16×16 luminance signal generator include a first vertical prediction mode, a first horizontal prediction mode, a first DC prediction mode, and a first plane prediction mode.

4. The apparatus as claimed in claim 3, wherein the various predetermined prediction modes in the 4×4 luminance signal generator include a second vertical prediction mode, a second horizontal prediction mode, a second DC prediction mode, a diagonal down/left prediction mode, a diagonal down/right prediction mode, a horizontal-left prediction mode, a horizontal-down prediction mode, a vertical-right prediction mode, and a horizontal-up prediction mode.

5. The apparatus as claimed in claim 4, wherein the various predetermined prediction modes in the chrominance signal generator include a third vertical prediction mode, a third horizontal prediction mode, a third DC prediction mode, and a third plane prediction mode.

6. A method of performing intra prediction for an image decoder, said method comprising the steps of:
   (a) storing image data;
   (b) parallel processing intra prediction with respect to 16×16 luminance component and 4×4 luminance component by means of horizontal/vertical blocks adjacent to the stored image data; and
   (c) after said parallel processing, performing intra prediction for chrominance component by means of the horizontal/vertical blocks adjacent to the stored image data;
   wherein the intra prediction with respect to the 16×16 luminance component in the (b) step is performed by selecting any one of a first vertical prediction mode, a first horizontal prediction mode, a first DC prediction mode, and a first plane prediction mode.

7. The method as claimed in claim 6, wherein the luminance and chrominance components share a single memory and are sequentially stored in said memory with the horizontal and vertical components of said luminance or chrominance component being separately stored in two 1×17 memory banks of said memory, respectively.

8. The method as claimed in claim 6, wherein the intra prediction with respect to the 4×4 luminance component in the (b) step is performed by selecting any one of a second vertical prediction mode, a second horizontal prediction mode, a second DC prediction mode, a diagonal down/left prediction mode, a diagonal down/right prediction mode, a horizontal-left prediction mode, a horizontal-down prediction mode, a vertical-right prediction mode, and a horizontal-up prediction mode.

9. The method as claimed in claim 8, wherein the intra prediction with respect to the chrominance component in the (b) step is performed by selecting any one of a third vertical prediction mode, a third horizontal prediction mode, a third DC prediction mode, and a third plane prediction mode.

10. The method as claimed in claim 8, wherein the luminance and chrominance components share a single memory and are sequentially stored in said memory with the horizontal and vertical components of said luminance or chrominance component being separately stored in two 1×17 memory banks of said memory, respectively.

11. The method as claimed in claim 9, wherein the luminance and chrominance components share a single memory and are sequentially stored in said memory with the horizontal and vertical components of said luminance or chrominance component being separately stored in two 1×17 memory banks of said memory, respectively.

12. The apparatus as claimed in claim 2, wherein said memory consists of said two 1×17 memory banks.

13. The method as claimed in claim 7, wherein said memory consists of said two 1×17 memory banks.

14. The method as claimed in claim 7, wherein firstly, the horizontal and vertical components of the luminance component of the image data are stored in the two memory banks of the memory and are used in said parallel processing intra prediction with respect to the 16×16 luminance component and 4×4 luminance component; and subsequently, the horizontal and vertical components of the chrominance component of the image data are stored in the two memory banks of the memory and are used in said intra prediction for the chrominance component.

* * * * *